United States Patent
Furukawa et al.

[11] 3,817,968
[45] June 18, 1974

[54] METHOD OF PRODUCING EQUIBINARY (CIS 1.4-1.2) POLYBUTADIENE

[75] Inventors: Junji Furukawa, Kyoto; Eiichi Kobayashi; Takahiro Kawogoe, both of Uji, all of Japan

[73] Assignee: Bridgestone Tire Company Limited, Tokyo, Japan

[22] Filed: Nov. 28, 1972

[21] Appl. No.: 310,021

[52] U.S. Cl. .......................... 260/94.3, 252/431 C
[51] Int. Cl. ....................... C08d 1/18, C08d 3/06
[58] Field of Search ..................................... 26/94.3

[56] References Cited
UNITED STATES PATENTS

| | | | |
|---|---|---|---|
| 3,118,864 | 1/1964 | Robinson et al. | 260/92.3 |
| 3,415,801 | 12/1968 | Coover | 260/93.7 |
| 3,663,480 | 5/1972 | Zllinski et al. | 252/431 |

*Primary Examiner*—Joseph L. Schofer
*Assistant Examiner*—William F. Hamrock
*Attorney, Agent, or Firm*—Stevens, Davis, Miller & Mosher

[57] ABSTRACT

Novel equibinary (Cis 1.4-1.2) polybutadiene which contains substantially equimolar of Cis 1.4 structure and 1.2 structure and does not almost contain trans 1.4 structure is produced by using a catalyst (1) which is prepared from trialkylaluminum and (b) dialkoxymolybdenum trichloride or a catalyst (2) which is prepared from (a') dialkylaluminum chloride and (b') molybdenum acetylacetonate.

8 Claims, 3 Drawing Figures

Fig_1

METHOD OF PRODUCING EQUIBINARY (CIS 1.4-1.2) POLYBUTADIENE

This invention relates to the process for producing of equibinary (Cis 1.4-1.2) polybutadiene.

The term "equibinary" (Cis 1.4-1.2) polybutadiene represents polybutadiene which contains substantially equimolar of Cis 1.4 structure and 1.2 structure and does not almost contain trans 1.4 structure.

More precisely, it represents polybutadiene of which Cis 1.4 structure content and 1.2 structure content are within the range of 42 to 55% respectively and of which trans 1.4 structure content is less than 5%. Recently, much attention is being denoted in rubber industry to the polydiene of a 1:1 composition of the geometrical isomer unit e.g., (Cis 1.4-3.4) polyisoprene, (1.2-3.4) polyisoprene and (Cis 1.4-trans 1.4) polybutadiene, which were named by Dawans et al. as equibinary polydiene, because of their mechanical properties and their broad application for industrial articles.

The inventors have already found the formation of equibinary (Cis 1.4-1.2) polybutadiene by using the cobalt trisacetyl acetonate-trialkylaluminum-$H_2O$ catalyst system, which is disclosed in Japanese Pat. No. 549,752.

Takeuchi et al. also reported the preparation of equibinary (Cis 1.4-1.2) polybutadiene by using $AlR_3$-$H_2O$-$CH_3SSCH_3$-$CoBr_2(ph_3P)_n$ catalyst (Preprints 22nd Annual Meeting of the Chemical Society, Japan, Tokyo (1969) p. 2,122).

The cobalt catalyst systems mentioned above, however, were susceptible to produce 1.2-polybutadiene or gel rich polymer.

Therefore, the selection of polymerization condition, catalyst mole ratio and other factors for producing equibinary polydiene was rather difficult.

Moreover, in such a way it was not reproducible to obtain gel free equibinary (Cis 1.4-1.2) polybutadiene having desired molecular weight.

Inventors have now succeeded to produce equibinary (Cis 1.4-1.2) polydiene with good reproducibility and with high activity by using the catalyst consisting of alkyl-aluminum compound and molybdenum compound under the restricted condition.

It has been well known that butadiene is polymerized by the catalyst system containing organometallic compound and molybdenum compound.

For example, U.S. Pat. No. 3,118,864 (published on Jan. 21, 1964) has proposed that the conjugated diene such as butadiene, isoprene or chloroprene is polymerized by the binary catalyst system consisting of (i) esters or halides of titanium, zirconium, selium, vanadium, niobium, tantalum, chromium, molybdenum or wolfram and (ii) organometallic compound having at least one metal-carbon bond. That is, the above catalyst component (1) involves esters or halides of molybdenum and molybdenum pentachloride is disclosed as one embodiment but the working example discloses only titanium tetrachloride.

As the above catalyst component (11), phenyl-magnesium bromide, lithium aluminum tetraalkyl and dimethyl-cadmium are mentioned in the specification but the working example discloses only lithium aluminum tetrabutyl and phenyl-magnesium bromide.

That is, trialkylaluminum and dialkylaluminum chloride to be used in this invention have not been disclosed in the above described U.S. Patent.

Equibinary (Cis 1.4-1.2) polybutadiene cannot be obtained by using organoaluminum compound other than trialkylaluminum or dialkylaluminum chloride as described hereinafter as catalyst component.

None of description have also been found in the U.S. Patent cited above with respect to the production of equibinary (Cis 1.4-1.2) polybutadiene as defined in the present invention.

It has been well known that 1.2 polybutadiene is produced in butadiene polymerization by using the catalyst containing molybdenum compound, which has been proposed, for example, in Japanese Pat. No. 558,687, U.S. Pat. No. 3,067,188, No. 3,336,280, No. 3,116,273, and No. 3,232,920 and G. Natta's paper (Journal of Polymer Science 48 219 (1960).

As seen from these prior arts in any case 1.2 polybutadiene is produced when using molybdenum compound as the catalyst component. Accordingly, it cannot entirely be conceived from these prior arts that the equibinary (Cis 1.4-1.2) polybutadiene can be produced by using a molybdenum compound as in the present invention.

Catalyst system (1) to be used in this invention is prepared from a component (a) trialkylaluminum having a general formula.

wherein R represents a linear aliphatic hydrocarbon radical having 1-6 carbon atoms and a component (b) dialkoxy molybdenum trichloride having a general formula

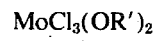

wherein R' represents a hydrocarbon radical having 1-6 carbon atoms at the molar ratio (a)/(b) of not less than 6 ((a)/(b) ≧ 6).

In this case, when the polymerization is effected at the molar ratio (a)/(b) of less than 6 in the catalyst system (1), the resulting polybutadiene consists mainly of 1.2 structure.

When the polymerization is effected by using the other organoaluminum compounds, for example, dialkylaluminum halide, such as diethylaluminum chloride; alkylaluminum sesquihalide, such as ethylaluminum sesquichloride; alkylaluminum dihalide, such as ethylaluminum dichloride; or dialkylaluminum alkoxide, such as diethylaluminum ethoxide as the catalyst component (a) instead of trialkylaluminum, equibinary (Cis 1.4-1.2) polybutadiene cannot be obtained at any molar ratio.

Also, it is essential factor of this invention that the alkyl radical of trialkylaluminum should be a linear aliphatic hydrocarbon radical. When the alkyl radical of trialkylaluminum is branched hydrocarbon radical, such as isobutyl radical, equibinary (Cis 1.4-1.2) polybutadiene cannot be obtained.

Other organometallic compounds than aluminum compound, such as alkylalkalimetallic compounds or alkylalkali earth metallic compounds do not give equibinary (Cis 1.4-1.2) polybutadiene. In this invention, molybdenum compound to be combined with trialkylaluminum is limited to dialkoxymolybdenum trichloride. Catalyst system prepared from molybdenum alkoxide, halide or acetylacetonate and trialkylaluminum gives 1.2 polybutadiene or solvent insoluble powdery polymer (G. Natta, Journal of Polymer Science 48 219 (1960) and F. Dawance, P. Teyssie, Bull. Soc. Chim. France 1967 2930).

The powdery polymers obtained by the method as described in cited literature are insoluble in solvent and cannot be analyzed and are quite different from the equibinary (Cis 1.4–1.2) polybutadiene of this invention, which is rubber like elastomer and soluble in hydrocarbon solvent.

Another catalyst system (2) of this invention is prepared from a component (a') dialkylaluminum chloride having a general formula $$R''_2AlCl$$

wherein R'' represents an aliphatic hydrocarbon radical having 1 to 6 carbon atoms and a component (b') molybdenum acetylacetonate at the molar ratio (a')/(b') of not less than 9 ((a')/(b') ≧ 9). 1.2-polybutadiene is mainly obtained, as described in the cited literature, when the (a')/(b') molar ratio is less than 9.

When trialkylaluminum, alkylaluminum sesquihalide, alkylaluminum dihalide or their derivative are used in combination with molybdenum acetylacetonate instead of dialkylaluminum chloride, only 1.2-polybutadiene or the mixture of 1.2-polybutadiene and Cis 1.4 or trans 1.4 polybutadiene is obtained.

Furthermore, when dialkoxymolybdenum trichloride or molybdenum pentachloride is used in combination with dialkylaluminum chloride instead of molybdenum acetylacetonate, equibinary (Cis 1.4–1.2) polybutadiene cannot be obtained.

This invention as described above can only be accomplished under the selected combination of the catalyst components and the restricted component ratio.

The catalyst component (a) of the catalyst system (1) to be used in this invention is at least one of organoaluminum compounds having a general formula $$AlR_3$$

wherein R represents a linear aliphatic hydrocarbon radical having 1 to 6 carbon atoms.

As these aluminum compounds, mention may be made of trimethylaluminum, triethylaluminum, tri-n-propylaluminum, tri-n-butylaluminum, tri-n-pentylaluminum, tri-n-hexylaluminum and their mixtures.

Among them, trimethylaluminum, triethylaluminum, tri-n-propylaluminum and tri-n-butylaluminum are preferable.

The catalyst component (a') of the catalyst system (2) to be used in this invention is at least one of dialkylaluminum chlorides having a general formula $$R''_2AlCl$$

wherein R'' represents a linear aliphatic hydrocarbon radical having 1 to 6 carbon atoms.

As these aluminum compounds, mention may be made of dimethylaluminum chloride, diethylaluminum chloride, di-n-propylaluminum chloride, di-n-butylaluminum chloride, di-n-pentylaluminum chloride, di-n-hexylaluminum chloride and their mixtures.

Among them, dimethylaluminum chloride, diethylaluminum chloride, di-n-propylaluminum chloride and di-n-butylaluminum chloride are preferable.

The catalyst component (b) of the catalyst system (1) to be used in this invention is at least one of dialkoxymolybdenum trichloride having a general formula $$MoCl_3(OR')_2$$

wherein R' represents a hydrocarbon radical having 1 to 6 carbon atoms, for example, methyl radical, ethyl radical, propyl radical, and butyl radical, etc.

The catalyst component (b') of the catalyst system (2) to be used in this invention is molybdenum acetylacetonate complex compound. It involves molybdenyl acetylacetonate (VI) and molybdenum acetylacetonate (IV). Among them, molybdenyl acetylacetonate (VI) is preferable.

The molar ratio (a)/(b) of the catalyst system (1) to be used in this invention is not less than 6 ((a)/(b) ≧ 6), preferably within the range of 6 to 100, more preferably within the range of 6 to 20.

The molar ratio (a')/(b') of the catalyst system (2) to be used in this invention is not less than 9 ((a')/(b') ≧9), preferably within the range of 9 to 100, more preferably within the range of 9 to 50.

The catalyst concentration is not particularly limited but a molybdenum component is $10^{-4}$–$10^{-1}$ mole based on 1 mole or butadiene.

The catalyst system to be used in this invention is prepared by mixing both the catalyst components in the presence or absence of a solvent which does not inhibit the polymerization reaction.

As such solvent, mention may be made of aromatic hydrocarbons, alicyclic hydrocarbons, aliphatic hydrocarbons, halogenated hydrocarbons and halogenated carbons, for example, benzene, toluene, xylene, cyclohexane, propane, butane, pentane, hexane, heptane, octane, ligroin, petroleum ether, chlorobenzene, dichlorobenzene, dichloromethane, dichloroethane, trichloroethane, tetrachloroethane and their mixtures.

Among them, aromatic hydrocarbons such as benzene, toluene, xylene, etc. preferable.

The polymerization is carried out in the absence of water, air and other inhibitors for the polymerization at a temperature of −80° C to +100° C, preferably −78° C to +60° C, under a pressure from one determined by vapor pressure in the reaction system to 50 atom.

The various methods of admixing the monomer with catalyst can be taken in this invention, such as, admixing butadiene as gas phase with the catalyst solution, admixing liquefied butadiene with catalyst solution or admixing butadiene-solvent system with catalyst components, etc.

After the completion of the polymerization reaction, conventional after-treatments are carried out to purify and recover the resulting polymer. These treatments include alcohol precipitation, alcohol washing, alcohol-hydrochloric acid washing, hot water stripping, water hydrochloric acid washing and the like.

The microstructure of butadiene units is determined in carbon disulfide solution by infrared spectrophotometry according to the method of Morero et al. (D. Morero et al., Chim. e Ind. Vol. 4, p. 758 (1959)).

For a better understanding of this invention, following drawings are referred, wherein.

Figure 1:
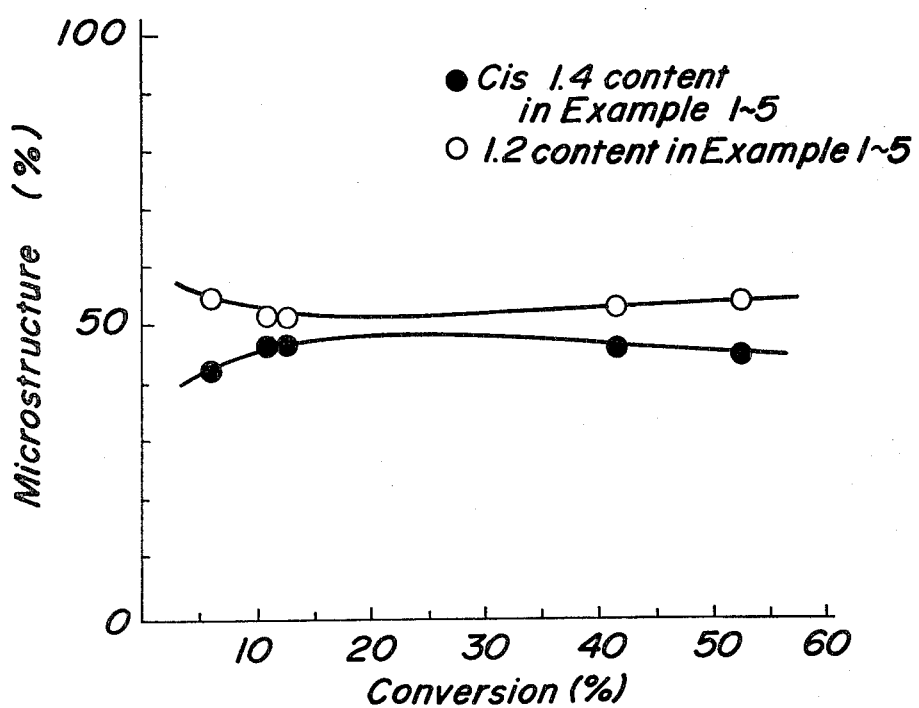
FIG. 1 shows the contents of Cis 1.4 unit and 1.2 unit of the resulting polybutadiene in the Example 1–5 corresponding to each conversion levels.
Figure 2:
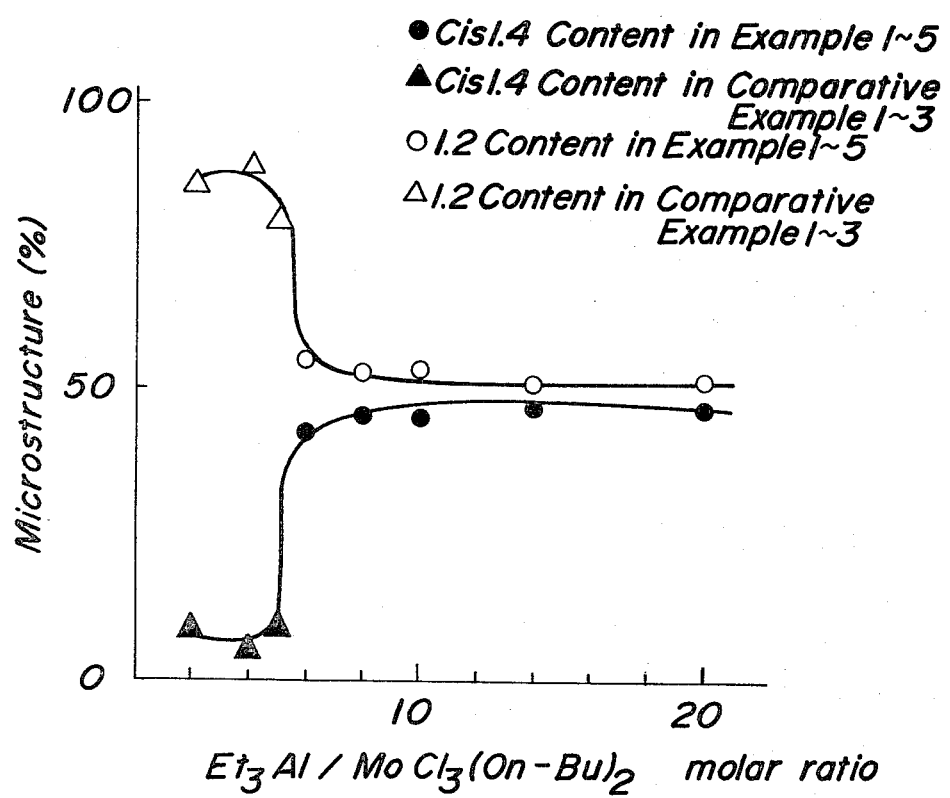
FIG. 2 shows the contents of Cis 1.4 unit and 1.2 unit of the resulting polybutadiene in the Example 1–5 corresponding to each Al/Mo molar ratio.
Figure 3:
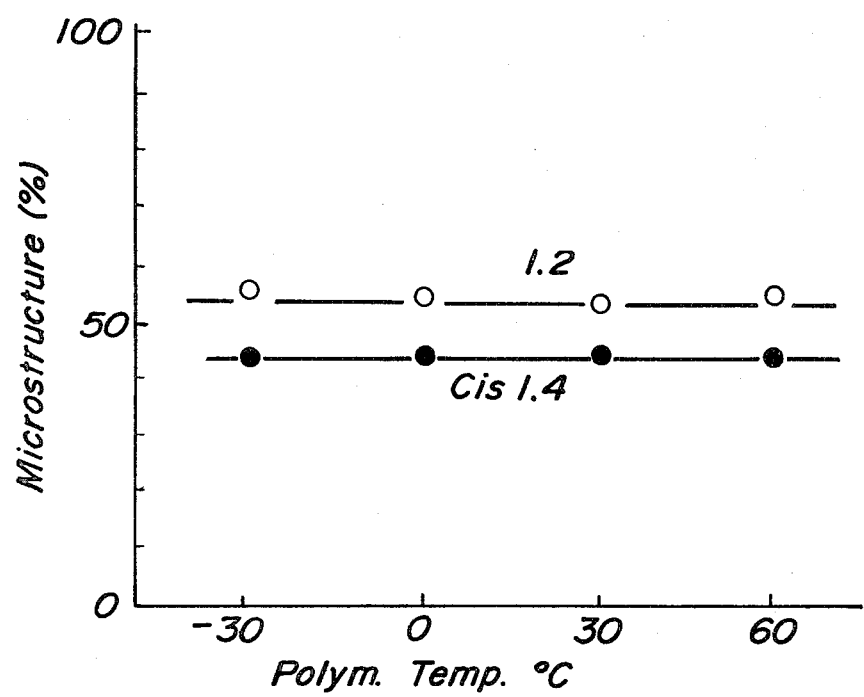
FIG. 3 shows the contents of Cis 1.4 unit and 1.2 unit of the resulting polymer of this invention corresponding to each polymerization temperature.

From FIGS. 1, 2 and 3, it can be seen that polymer obtained by this invention is equibinary (Cis 1.4–1.2) polybutadiene.

The equibinary (Cis 1.4–1.2) polybutadiene obtained by this invention has many uses as rubbers and plastics for all purposes and useful for tire, belt, hose, etc.

The following Examples are given in illustration of this invention and are not intended as limitations thereof.

EXAMPLE 1

20 ml of dried toluene and 0.2 mmole of di-n-butoxy molybdenum trichloride ($MoCl_3(OC_4H_9)_2$) were charged at −78° C to a glass ampule. Then, the variable amounts of triethylaluminum ($Al(C_2H_5)_3$) and 64.7 mmoles of butadiene were added thereto.

The ampule was sealed and subjected to polymerization. All polymerization procedure described above was performed under the nitrogen atmosphere. The polymerization reaction was conducted at 30° C for 18 hours.

After polymerization reaction, the ampule was opened and the reaction mixture was poured into a large amount of methanol containing 2.6-di-tert-butyl-p-cresol as an anti-oxidant to precipitate polymers.

Crude polymers obtained by this series of experiment often contained a small amount of gels or solvent insoluble materials which were removed by extraction with isopropyl ether.

The intrinsic viscosity [$\eta$] was measured in a toluene solution at 30° C with an Ubbelohde type viscometer.

The results of polymerization and analysis of polymers are shown in Table 1.

Table 1

| Example No. | $Al(C_2H_5)_3$ (mmole) | $\frac{Al(C_2H_5)_3}{MoCl_3(OC_4H_9)_2}$ (mole ratio) | Conversion (%) | Micro structure | | | [$\eta$] |
|---|---|---|---|---|---|---|---|
| | | | | Cis 1.4 | 1.2 | Trans 1.4 | |
| 1 | 1.2 | 6 | 6.0 | 42.4 | 54.6 | 3.0 | — |
| 2 | 1.6 | 8 | 41.7 | 45.3 | 52.8 | 1.9 | 0.90 |
| 3 | 2.0 | 10 | 52.7 | 44.9 | 53.9 | 1.2 | 0.75 |
| 4 | 2.8 | 14 | 12.4 | 46.9 | 50.9 | 2.2 | — |
| 5 | 4.0 | 20 | 10.8 | 46.6 | 51.5 | 1.9 | — |

It is clearly shown that the polymer obtained contains equimolar of Cis 1.4 and 1.2 structure and does not almost contain trans 1.4 structure.

From the results obtained by Example 1–5, relationship between conversion and microstructure of the resulting polymer and relationship between catalyst composition ($Al(C_2H_5)_3/MoCl_3(OC_4H_9)_2$ molar ratio) and microstructure of the resulting polymer were obtained, which were shown in FIG. 1 and FIG. 2. It was suggested that equibinary (Cis 1.4–1.2) polybutadiene was obtained in claimed polymerization condition.

COMPARATIVE EXAMPLE 1–3

In a similar manner as described in Example 1–5, the polymerization was conducted except that the amount of triethylaluminum was decreased.

The polymer which had mainly 1.2 structure was obtained as shown in Table 2 and FIG. 2. As shown in Table 2 and FIG. 2 it was observed that equibinary (Cis 1.4–1.2) polybutadiene was not obtained.

Table 2

| Comparative Example No. | $Al(C_2H_5)_3$ (mmole) | $\frac{Al(C_2H_5)_3}{MoCl_3(OC_4H_9)_2}$ (mole ratio) | Conversion (%) | Micro structure | | |
|---|---|---|---|---|---|---|
| | | | | Cis 1.4 | 1.2 | Trans 1.4 |
| 1 | 0.4 | 2 | 60.2 | 8.4 | 85.4 | 6.2 |
| 2 | 0.8 | 4 | 14.6 | 4.1 | 88.4 | 7.5 |
| 3 | 1.0 | 5 | 2.6 | 8.2 | 79.1 | 12.7 |

EXAMPLE 6

The same experiment was conducted as described in Example 2 except that the polymerization was effected at −30° C for 50 hours.

The polymer obtained was rubbery solid in a yield of 6.8% which contained 11% of isopropylether insoluble parts.

The microstructure of the polymer was 44.2% of Cis 1.4 structure, 54.6% of 1.2 structure and 1.2% of trans 1.4 structure.

EXAMPLE 7

In a similar manner as described in Example 3, the polymerization was effected at 60° C for 7.0 hours.

The rubbery solid was obtained in a yield of 21.3%, which contained 40% of isopropyl ether insoluble parts.

The microstructure of the polymer obtained was 45.5% of Cis 1.4 structure, 52.4% of 1.2 structure and 2.1% of trans 1.4 structure.

The intrinsic viscosity was 0.8.

EXAMPLE 8–10

In a similar manner as described in Example 3, the polymerization was effected except that the various kinds of solvent as indicated in the following Table 3 was used instead of toluene. Equibinary (Cis 1.4–1.2) polybutadiene was obtained in all cases as shown in Table 3.

Table 3

| Example No. | Solvent | Conversion (%) | Micro structure | | |
|---|---|---|---|---|---|
| | | | Cis 1.4 | 1.2 | Trans 1.4 |
| 8 | 1.2-dichloroethane | 23.3 | 48.9 | 49.0 | 2.1 |
| 9 | chlorobenzene | 40.2 | 48.9 | 49.5 | 1.6 |
| 10 | o-dichlorobenzene | 32.7 | 48.4 | 50.0 | 1.6 |

Table 6

| Comparative Example No. | Aluminum Compound | (mmole) | Conversion (%) | Micro structure | | |
|---|---|---|---|---|---|---|
| | | | | Cis 1.4 | 1.2 | Trans 1.4 |
| 4 | $(C_2H_5)_2AlCl$ | 1.6 | 3.9 | 40.0 | 22.0 | 38.0 |
| 5 | do. | 2.0 | 1.2 | 43.0 | 24.0 | 33.0 |
| 6 | do. | 4.0 | 0.7 | 51.6 | 36.0 | 12.4 |
| 7 | $(C_2H_5)_{1.5}AlCl_{1.5}$ | 1.6 | 24.9 | 37.0 | 13.1 | 49.9 |
| 8 | do. | 2.0 | 30.3 | 37.0 | 12.0 | 51.0 |
| 9 | do. | 4.0 | 7.4 | 35.5 | 14.6 | 49.9 |
| 10 | $C_2H_5AlCl_2$ | 1.6 | 100 | 33.3 | 24.7 | 42.0 |
| 11 | do. | 2.0 | 84.0 | 35.0 | 25.0 | 40.0 |
| 12 | do. | 4.0 | 83.4 | 43.6 | 10.2 | 46.2 |
| 13 | $(C_2H_5)_2AlOC_2H_5$ | 0.8 | 86.9 | 6.2 | 85.9 | 7.9 |
| 14 | do. | 1.6 | 50.3 | 7.9 | 83.3 | 8.8 |
| 15 | do. | 4.0 | 100 | 9.7 | 82.2 | 8.1 |

EXAMPLE 11–13

In a similar manner as described in Example 1 and 3, the polymerization was effected except that diethoxy molybdenum trichloride ($MoCl_3(OC_2H_5)_2$) or dimethoxy molybdenum trichloride ($MoCl_3(OCH_3)_2$) was used instead of dibutoxy molybdenum trichloride. Equibinary (Cis 1.4–1.2) polybutadiene was obtained as shown in Table 4.

Table 4

| Example No. | $MoCl_3(OR')_2$ | $Al(C_2H_5)_3$ (mmole) | Conversion (%) | Micro structure | | |
|---|---|---|---|---|---|---|
| | | | | Cis 1.4 | 1.2 | Trans 1.4 |
| 11 | $MoCl_3(OC_2H_5)_2$ | 1.2 | 23.6 | 45.4 | 53.0 | 1.6 |
| 12 | do. | 2.0 | 5.6 | 45.6 | 51.2 | 3.2 |
| 13 | $MoCl_3(OCH_3)_2$ | 2.0 | 50.4 | 46.4 | 52.0 | 1.6 |

EXAMPLE 14–20

In a similar manner as described in Example 1–5, the polymerization was effected except that the variable amount of trimethylaluminum ($Al(CH_3)_3$), tri-n-propyl aluminum ($Al(n-C_3H_7)_3$) or tri-n-butyl aluminum ($Al(n-C_4H_9)_3$) was used instead of triethyl aluminum. The results obtained are shown in Table 5.

Table 5

| Example No. | $AlR_3$ | (mmole) | Conversion (%) | Micro structure | | |
|---|---|---|---|---|---|---|
| | | | | Cis 1.4 | 1.2 | Trans 1.4 |
| 14 | $Al(CH_3)_3$ | 1.6 | 8.3 | 45.2 | 51.7 | 3.1 |
| 15 | do. | 2.0 | 14.0 | 46.6 | 51.4 | 2.0 |
| 16 | $Al(n-C_3H_7)_3$ | 1.6 | 15.1 | 47.7 | 48.4 | 3.9 |
| 17 | do. | 2.0 | 13.0 | 53.3 | 46.0 | 3.7 |
| 18 | do. | 4.0 | 15.7 | 54.2 | 42.1 | 3.7 |
| 19 | $Al(n-C_4H_9)_3$ | 2.0 | 6.2 | 45.6 | 51.0 | 3.4 |
| 20 | do. | 4.0 | 8.4 | 46.7 | 49.5 | 3.8 |

COMPARATIVE EXAMPLE 4–15

In a similar manner as described in Example 1–5, the polymerization was effected except that the variable amount of diethylaluminum chloride ($(C_2H_5)_2AlCl$), ethylaluminum sesquichloride ($(C_2H_5)_{1.5}AlCl_{1.5}$), ethylaluminum dichloride ($C_2H_5AlCl_2$) or diethylaluminum ethoxide ($(C_2H_5)_2AlOC_2H_5$) was used instead of triethylaluminum.

The polymerization was effected for 38 hours. The results obtained are shown in Table 6.

From the results as shown in Table 6, it was observed that the aluminum component to be used in this invention had to be trialkylaluminum in order to obtain equibinary (Cis 1.4–1.2) polybutadiene.

EXAMPLE 21–24

0.2 mmole of molybdenyl (VI) acetylacetonate ($MoO_2(CH_3COCHCOCH_3)_2$) and 20 ml of purified toluene were charged into a glass ampule at $-78°$ C and then the variable amount of diethylaluminum chloride ($(C_2H_5)_2AlCl$) and 64.7 mmoles of butadiene were added thereto.

The ampule was sealed and the polymerization was effectd at 30° C for 23 hours.

After polymerization reaction, the ampule was opened and the reaction mixture was poured into a large amount of methanol containing 2.6-di-tert-butyl-p-cresol to obtain the rubbery polymer.

The results obtained are shown in Table 7. All of the polymers obtained in these Examples were equibinary (Cis 1.4–1.2) polybutadiene.

Table 7

| Example No. | $(C_2H_5)_2AlCl$ (mmole) | $(C_2H_5)_2AlCl$ / $MoO_2(CH_3COCHCOCH_3)_2$ (mole ratio) | Conversion (%) | Micro structure | | |
|---|---|---|---|---|---|---|
| | | | | Cis 1.4 | 1.2 | Trans 1.4 |
| 21 | 1.8 | 9 | 4.0 | 44.0 | 54.0 | 2.0 |
| 22 | 4.0 | 20 | 7.9 | 46.3 | 51.6 | 2.1 |
| 23 | 8.0 | 40 | 4.1 | 49.4 | 48.8 | 1.8 |
| 24 | 10.0 | 50 | 3.5 | 49.2 | 48.0 | 2.8 |

COMPARATIVE EXAMPLE 16–18

In a similar manner as described in Example 21–24, the polymerization was effected except that the variable amount of diethylaluminum chloride was used at the $(C_2H_5)_2AlCl/MoO_2(CH_3COCHCOCH_3)_2$ molar ratio of less than 9.

The results obtained are shown in Table 9. The polymers obtained in these Examples were the polymers which contain mainly 1.2-bond.

Table 8

| Comparative Example No. | $(C_2H_5)_2AlCl$ (mmole) | $\dfrac{(C_2H_5)_2AlCl}{MoO_2(CH_3COCHCOCH_3)_2}$ (mole ratio) | Conversion (%) | Micro structure | | |
|---|---|---|---|---|---|---|
| | | | | Cis 1.4 | 1.2 | Trans. 1.4 |
| 16 | 0.4 | 22 | 100 | 2.5 | 92.4 | 5.1 |
| 17 | 1.2 | 6 | 8.7 | 7.5 | 86.1 | 6.4 |
| 18 | 1.6 | 8 | 4.1 | 20.3 | 73.9 | 5.8 |

COMPARATIVE EXAMPLE 19–25

In a similar manner as described in Example 21–24, the polymerization was effected except that the variable amount of ethylaluminum sesquichloride $((C_2H_5)_{1.5}AlCl_{1.5})$ or ethylaluminum dichloride $(C_2H_5AlCl_2)$ instead of diethyl aluminum chloride was used.

The results obtained are shown in Table 9. It was observed from the table that the equibinary (Cis 1.4–1.2) polybutadiene was not obtained by use of the catalyst prepared from molybdennyl acetylacetonate and the aluminum component other than diethylaluminum chloride.

Table 9

| Comparative Example No. | Aluminum Component | (mmole) | Conversion (%) | Micro structure | | |
|---|---|---|---|---|---|---|
| | | | | Cis 1.4 | 1.2 | Trans 1.4 |
| 19 | $(C_2H_5)_{1.5}AlCl_{1.5}$ | 0.4 | 100 | 3.0 | 90.4 | 6.6 |
| 20 | do. | 2.0 | 1.0 | 40.0 | 40.0 | 20.0 |
| 21 | do. | 4.0 | 0.2 | 44.6 | 23.7 | 31.7 |
| 22 | $C_2H_5AlCl_2$ | 0.4 | 10.8 | 6.3 | 87.0 | 6.7 |
| 23 | do. | 0.8 | 4.2 | 11.9 | 61.0 | 27.1 |
| 24 | do. | 2.0 | 3.4 | 54.0 | 9.3 | 36.6 |
| 25 | do. | 4.0 | 3.2 | 48.9 | 10.8 | 40.3 |

What is claimed is:

1. A method of producing equal binary (cis 1.4–1.2) polybutadiene, which comprises
polymerizing polybutadiene
at a temperature of −80° C to 100° C
under an inert atmosphere in a non-aqueous medium,
in the presence of a catalyst which is prepared from
(a) trialkyl aluminum having a general formula $$AlR_3$$

wherein R represents a linear aliphatic hydrocarbon radical having 1 – 6 carbon atoms and (b) dialkoxy molybdenum trichloride having a general formula $$MoCl_3(OR')_2$$

wherein R' represents a hydrocarbon radical having 1 – 6 carbon atoms, the molar ratio (a)/(b) being not less than 6.

2. The method as claimed in claim 1, wherein the component (a) of the catalyst is selected from the group consisting of trimethylaluminum, triethylaluminum, tri-n-propyl aluminum and tri-n-butyl aluminum.

3. The method as claimed in claim 1, wherein the component (b) of the catalyst is selected from the group consisting of dimethoxy molybdenum trichloride, diethoxy molybdenum trichloride, di-n-propoxy molybdenum trichloride and di-n-butoxy molybdenum trichloride.

4. The method as claimed in claim 1, wherein the molar ratio (a)/(b) of the catalyst is within the range of 6 to 100.

5. The method as claimed in claim 1, wherein the molar ratio (a)/(b) of the catalyst is within the range of 6 to 20.

6. The method as claimed in claim 1, wherein the polymerization is effected in non-aqueous medium selected from the group consisting of aromatic hydrocarbons, aliphatic hydrocarbons, alicyclic hydrocarbons and halogenated hydrocarbons.

7. The method as claimed in claim 1, wherein the polymerization is effected in an aromatic hydrocarbon.

8. The method as claimed in claim 1, wherein the polymerization is effected at a temperature of −78° C to 60° C.

* * * * *